United States Patent
Tabel

(10) Patent No.: US 12,347,078 B2
(45) Date of Patent: Jul. 1, 2025

(54) METHOD AND INSTALLATION FOR RECONSTRUCTING TIME SERIES, DEGRADED BY THE DEGREE OF UTILIZATION

(71) Applicant: Stefan Tabel, Feldafing (DE)

(72) Inventor: Stefan Tabel, Feldafing (DE)

( * ) Notice: Subject to any disclaimer, the term of this patent is extended or adjusted under 35 U.S.C. 154(b) by 867 days.

(21) Appl. No.: 17/113,566

(22) Filed: Dec. 7, 2020

(65) Prior Publication Data

US 2021/0233216 A1    Jul. 29, 2021

Related U.S. Application Data

(63) Continuation of application No. PCT/EP2019/064984, filed on Jun. 7, 2019.

(30) Foreign Application Priority Data

Jun. 8, 2018 (DE) .......................... 102018209176.5

(51) Int. Cl.
G06T 5/73 (2024.01)

(52) U.S. Cl.
CPC ..................... *G06T 5/73* (2024.01)

(58) Field of Classification Search
CPC ......... G06T 5/003; G06T 5/73; H04N 23/683; H04N 23/687; H04N 23/10; H04N 23/12
See application file for complete search history.

(56) References Cited

U.S. PATENT DOCUMENTS

| | | | |
|---|---|---|---|
| 4,876,509 A | 10/1989 | Perlmutter | |
| 9,063,344 B1 | 6/2015 | Griffin et al. | |
| 2005/0058352 A1* | 3/2005 | Deliwala | G01J 3/021 382/232 |
| 2005/0254112 A1* | 11/2005 | Webb | G02B 26/0825 359/224.1 |
| 2008/0238747 A1* | 10/2008 | Moore | H03M 1/0609 341/144 |
| 2014/0267852 A1* | 9/2014 | Bluzer | H04N 25/713 348/297 |
| 2015/0334304 A1* | 11/2015 | Gavant | H04N 23/6845 348/208.1 |

(Continued)

FOREIGN PATENT DOCUMENTS

| | | |
|---|---|---|
| EP | 0272111 A2 | 7/1990 |
| WO | 2016182607 A1 | 11/2016 |

OTHER PUBLICATIONS

WIPO, International Search Report mailed Dec. 19, 2019 in International Appln. No. PCT/EP2019/064984, (10 p.).

(Continued)

*Primary Examiner* — Syed Haider
(74) *Attorney, Agent, or Firm* — Siritzky Law, PLLC

(57) ABSTRACT

Method for correcting amplitude underestimations in time series, which were measured on sequences of multi-dimensional signals, wherein the multi-dimensional signals were sampled with one or more integrating sensors, such that the time series are degraded by a center of gravity/centroid formation, which can be characterized by a duty cycle of the integrating sensors. According to the invention, a centroid formation of the time series is corrected based on the duty cycle, the duty cycle or the integration time of the sensors.

17 Claims, 18 Drawing Sheets

(56) References Cited

U.S. PATENT DOCUMENTS

2018/0020178 A1* 1/2018 Geese ................. H04N 25/134

OTHER PUBLICATIONS

WIPO, Written Opinion mailed Dec. 19, 2019 in International Appln. No. PCT/EP2019/064984, (34 p.).
WIPO, International Preliminary Report mailed Dec. 8, 2020 in International Appln. No. PCT/EP2019/064984, (19 p.).
Gong et al., "Self-Paced Kernel Estimation for Robust Blind Image Deblurring," 2017 IEE International Conference on Computer Vision, Oct. 22, 2017, pp. 1670-1679.
Kober et al., "Restoration of Multispectral Images Distorted by Spatially Nonuniform Camera Motion," Journal of Communications Technology and Electronics, vol. 60, No. 12, Dec. 16, 2015, pp. 1366-1371.

* cited by examiner

METHOD AND INSTALLATION FOR RECONSTRUCTING TIME SERIES, DEGRADED BY THE DEGREE OF UTILIZATION

RELATED APPLICATION

This application is a continuation of International Application No. PCT/EP2019/064984, filed Jun. 7, 2019, the entire contents of which are hereby fully incorporated herein by reference for all purposes. PCT/EP2019/064984 claims priority from German application DE 102018209176.5, filed Jun. 8, 2018, the entire contents of which are hereby fully incorporated herein by reference for all purposes.

FIELD OF THE INVENTION

The invention relates to a method and a device for reconstructing time series, which are degraded by duty cycles of the sensors used.

BACKGROUND

In the prior art, the measurement of an (equidistant) time series is characterized by the following parameters: The number N of equidistant, temporal sampling points to which measurements (samples) are acquired.

The time interval between two such adjacent support points $t\_s$ (sampling time).

The discrete points in time $[n*t\_s]$ at which the samples are taken.

The inverse of the sampling time, the measurement frequency $f\_s$, indicates the number of measurement per time.

The continuous signal $x(t)$, which is to be measured directly or indirectly by a sensor. This signal is usually dependent on the time, such that the time series measures the variation of the signal along the time.

Always, the variation of a feature over time is mapped. A plurality of samples (number N) of a repeated measurement therefore forms a time series of the length N, which generally also has representation in a transformation space.

However, it is often assumed that the measurement of the time series is ideal. The time period over which a single sample was measured is estimated with zero. It is thus assumed that the sample was an ideal Dirac pulse.

This assumption of a perfect Dirac pulse is insufficient, however, especially if the measurement is carried out by means of a sensor which integrates the measured signal over a certain period of time, for example by means of a CCD sensor. In particular, this type of integrating sensors causes a center of gravity or centroid formation, which leads to the fact that the actual signal amplitude is underestimated at the relevant point in time. Therefore, a correction of this centroid formation is required.

A correction of time series of one-dimensional signals, for example current or voltage sensors, is known from the book "Signalverarbeitung in Beispielen: Verständlich erläutert mit Matlab und Simulink" (Josef Hoffmann and Franz Quint, De Gruyter Oldenbourg; Edition: 1, Sep. 12, 2016, p. 306).

In addition, known from the book "Modulation Transfer Function in Optical and Electro-Optical Systems" (Glenn D Boreman, Tutorial Texts in Optical Engineering Volume TT52, SPIE Press, Bellingham, Washington, USA, 2001) is a correction method for two-dimensional images recorded with arrays of integrating detectors (Chapter 2, "Detector Footprint MTF, equation 2.2, FIG. 2.4), which corrects the spatial amplitudes/frequencies of a single image using the spatial pixel extent based on only one image. However, the MTF of vibration and motion/motion is described there as a spatial MTF (Chapter 3, FIGS. 3.1 and 3.2). Still, this assumption leads to incomplete and partially incorrect corrections.

A better method for correcting so-called motion blur is disclosed by Ben-Ezra, M and Nayar, S K, ("Motion deblurring using hybrid imaging," in 2003 IEEE Computer Society Conference on Computer Vision and Pattern Recognition, 2003. Proceedings. 1, I {657 (I {664 vol.i, June 2003), using a second, faster camera which records a motion synchronously with the actual image. Nevertheless, the images, which are motion-compensated on this basis, deviate from the so-called "ground truth" without said work explaining this deviation. In particular, the time series obtained by means of the second camera is in turn not corrected.

The object of the present invention is therefore to provide a correction method for time series which have been measured on sequences of multi-dimensional signals, whereby the multi-dimensional signals have been sampled with one or more integrating sensors, which makes it possible, in particular, to compensate for the formation of centroids occurring on the basis of the physical properties of the sensor and to improve the measured values obtained therewith.

SUMMARY

This object is achieved by a method according to claim 1. Advantageous embodiments are disclosed in the subclaims.

According to one aspect, the invention expands the applied reconstruction of measured time series with integrating sensors by taking into account the parameter of the integration time $t\_int$ (tau=2*delta). In the case of a camera for example, one speaks of an exposure time, which is usually also adjustable. According to the invention, the integration time, which is not taken into account in the prior art during the measurement of time series, is used for correcting the measured time series.

A further possible definition of the parameter to be taken into account is that of the duty cycle $t\_int/t\_s$ (degree of utilization). This results from the relation of the integration time to the sampling time. The sampling time corresponds to a period duration in periodic measurements. The integration time is therefore generally smaller than the measuring period, so that the duty cycle indicates the relative duration of the measurement per period of the measurement. The values of the degree of utilization are thus between 0 and 1 and can be specified in percent.

The present invention defines the discrete sampling points $t\_s$ therewith differently as before, namely in the middle of the integration time $t\_int$. Symmetrical integration intervals Delta result around the sampling points $[n*t\_s]$, so that $2*delta=t\_int$ applies. Respecting the integration time $t\_int$ suggests that the sensor does not measure the values of the signal $x(t\_s)$. Instead, averaging over the signal $x(t)$ occurs in the time space $[t\_s-delta, t\_s+delta]$. This averaging results in a measurement of the centroid COG $(x(t\_s-delta, t\_s+delta))$ of the signal which can be set in a reversible mathematical relation with the sought signal $x(t\_s)$ under certain conditions. The continuous signal $x(t)$ always has a frequency decomposition or a description in the Fourier space. If it is sampled Nyquist-correctly, i.e. with a frequency twice as large as the highest frequency of the signal in the frequency space, it can be represented by means of a Fourier series. This representation with a Fourier series makes it possible to derive a boxcar filter: the continuous center of gravity of each frequency of the signal depends on this frequency itself by means of a sinc-function.

That is, there is a relationship between the continuous center of gravity (CoG) of the kth harmonic frequency and this frequency itself. This relation is a sinc function and describes the averaging by the sensor as a result of the integration as a continuous boxcar function. The standard condition, that the sampling of the discrete CoGs CoG [x(t), n×t_s, delta] is at least Nyquist-critical, is utilized to reconstruct both the discrete signal x[n×ts] and its continuous form x(t) via a discrete filter H(k). Each frequency is defined as $w_k = 2\pi k/N$. The duty cycle of the camera is therefore assumed to $\tau = 2\Delta$. Overall, it applies:

$$x(t) = x[n \times t_s] F^{-1}(F(\text{CoG}[x(t), n \times t_s, \tau]) \circ H(k)^{-1}), \text{ with}$$

$$H(k) = \begin{cases} 1, & \text{if } k = 0 \\ \dfrac{\sin\left(\dfrac{\pi k \tau}{N}\right)}{\dfrac{\pi k \tau}{N}}, & \text{else} \end{cases} \quad (1)$$

This sinc-function describes on the one hand the error, which was made by the non-ideal measurement with duty cycle. The DC component of the signal is unstressed as the only one. All higher frequencies are dependent on the frequency index and the temporal extension of the integration time, or the level of the duty cycle, and are systematically underestimated. The underestimation increases as the frequency increases, up to a maximum value of 2/Pi at the highest possible frequency and a maximum duty cycle. On the other hand, the sinc function can also be used for a possible correction of the amplitude underestimation. For this purpose, the sinc function is inverted and applied element by element to all frequencies of the time series. A retransformation of these corrected frequencies into the time domain then results in the corrected time series, which contains ideal samples of the non-ideally sampled signal.

Assuming that the signal x(t) has been sampled Nyquist-correctly the inverse of the filter can thus be used to carry out a correction. Here, the correct interpretation of the sampled signal itself is first required. As already described briefly, the correct sampling times n*t_s have to be defined in order to be able to carry out a correction. The method according to the invention functions only if these sampling times are defined in the middle of the duty cycle, otherwise the correction remains ineffective or is reduced in its effect. A further prerequisite is that the duty cycle is known with sufficient accuracy. The latter requirement is generally fulfilled because the duty cycle has been defined in electrical measuring systems with high accuracy or can be set up. Finally, it is also a prerequisite that the time series has been measured with equidistant sampling values, and that the sampling instants are known accurately. If all said prerequisites are fulfilled, the time series measured can be transformed into a transformation region, where it is calculated element by element with a correction term. In the simplest case, the transformation range is the Fourier space, and the correction term is the element-by-element inverse of said sinc function. This sinc function must be set up in a corresponding manner before the correction. The sinc function is defined as the quotient of a sine of an expression divided by this expression itself. The expression consists of the product of the variable duty cycle and frequency index.

The frequency index is defined according to its mathematical definition in the Fourier space (2*pi*k/N).

The duty cycle goes directly into the calculation, since it is already normalized to the sampling time and thus to the sampling frequency. The product of the scalar duty cycle and the vector frequency index is again a vector. Each element of the vector is now used as the input value in the Sinc function as said expression, such that a result of which the filter can be calculated element by element in its forward form. This forward form describes the error. The element-by-element inversion of the forward form of the filter then gives the correction values for the application to the individual frequencies of the signal. This inversion is generally possible since it is not divided by zero. The DC component of the filter with the frequency index zero is not defined, but can be considered continuously continuable. The DC-component is therefore set equal to one. All other components are not equal to zero because the frequency index as an input value in the Sinc function only calculates such values as the output of the Sinc function, which are always greater than zero. The correction is therefore always possible for Nyquist-correctly sampled signals. The transformed signal values can be multiplied element by element with the correction values, the element-by-element inverse of the sinc of said expression, so that an inverse Fourier transformation results in the sought signal.

This method can generally be applied with high precision, since the correction values themselves are known very accurately. The reason for this is that no or only little noise is applied to these correction values, and there are no zero or near zero frequencies in the filter description. Due to these three conditions, precise knowledge of the filter, zero to little noise, and no cut-off frequency, the filter can be used as a direct reconstruction filter, just by direct multiplication or division by the corresponding inverse.

The advantages of the correction according to the invention lie in the fact that, whenever a time series is measured using sensors, which have a duty cycle, the measured values, which have been obtained, can be corrected, so that they are not further estimated in terms of their amplitude. The direct use is obtained if the sense of the measurement lies in the acquisition of the correct values themselves, which is usually the case. Furthermore, knowledge about the correction can be used if a sensor is to be calibrated in order to obtain correct time series. This ambivalence provides the method of a basic problem: How can be verified that the correction method calculates the true, sought value of a signal, which at the same time verifies the assumption that the directly measured value of the signal is incorrect. Two paths are shown in the following. On the one hand, this can be achieved by measuring a known reference value, making the measurement comparable. However, known reference values indicate the selection of the sensors to a specific type. In addition, simulations can confirm the assumptions made.

VERIFICATION AND APPLICATION EXAMPLES

In the present case, the methodology is verified using cameras as sensors. Cameras allow a more general verification, since they can quantify at least two essential parameters of a photographed and thus measured object. These directly measurable parameters are the intensity of the object and the location of the object in relation to the camera. The determination of the location also allows a measurement by correlation. In a correlation, the location of the object relative to another location is determined. As a result, it can be illustrated that also relative measurements, or so-to-speak relative ones, benefit from amplitude corrections of time series.

For the first verification of the amplitude correction, an object is simulated which changes its location relative to a camera. The location is changed by means of translational motion that is to say by displacement along the coordinates of the simulated camera. The two time series of the location of the object are to be determined, given in pixel coordinates of the camera. The change in each pixel coordinate of the object is subject to a frequency distribution of which amplitudes are known, or which can be sufficiently estimated at the top. This makes it possible to select a suitable sampling frequency, in this case a frame rate of the camera. Using said sampling frequency, images of the object can be simulated. What is decisive here is that the location of the object is not stationary during the simulated acquisition of the photograph, that is to say it is assumed that the change in the coordinates runs continuously. Correspondingly, a duty cycle is taken into account in the simulation, which leads to a motion of the object during the exposure. This change in location of the object during the integration time is known to results in in motion-blur [Ben-Ezra, M and Nayar, S K, "Motion deblurring using hybrid imaging," in [2003 IEEE Computer Society Conference on Computer Vision and Pattern Recognition, 2003. Proceedings.], 1, I {657 (I {664 vol.i (June 2003)] in the individual photographs. It can be assumed that the motion blur in each photograph causes a displacement of this photograph, which is described by the centre of gravity of the motion blur via its point spread function (PSF). Correlations now calculate this offset of two images along the pixel coordinates. The measurement of time series by means of correlation therefore requires, as a rule, a plurality of simulated images. Furthermore, one of these images is always considered as a reference image, as a rule the first image of the series. This can be explained in that the correction values can be processed in real time in certain applications such as adaptive optics, for example to control actuators such as steerable mirrors. This selection of the reference image results in the time series of the location of the object being subject to an absolute offset, which corresponds to the offset of the reference image itself. This offset of the reference image can be corrected by the time series, but this is insignificant for the correction by the filter. Significant, in contrast, is that the time series of the location of the object represent only average values of the true location of the object, so that the sought time series is not correctly present. Precisely this relationship was measured in the simulations described. An image registration by means of correlation can therefore be further ascribed that the result is calculated as the spatial distance of the centers of gravity of the PSFs of the two simulated images, which is specified in pixel coordinates of the camera. Since the simulated camera has two pixel coordinates, two time series are generated according to the results of the image registration. Both time series describe a coordinate of the relative location of the camera in relation to the object in pixels, and must be corrected, as explained in the basic description, in order to obtain the true change in location. The simulations now show the residual error between the time series of registered location and true location, with and without the claimed correction. The residual error is clearly reduced. The use of the reduction of the residual error results from the prior art. The time series of the location of the object can be used to calculate a motion blur PSF as can be used to deconvolve a parallel-acquired, long-term exposed photograph, which has been degraded by the measured PSF. It is known to the person skilled in the art that the accuracy of the reconstructed PSF decisively decides on the quality of the deconvolution. This directly results in the benefit of reducing the error. It can also be shown how the transmission of the error from the time series of the location of the object acts on the PSF. The amplitude underestimation in the time series results in a radial underestimation of the PSF reconstructed from the registration values, such that the difference between the true PSF and those from registered values has a negative Strehl-ratio and a positive halo. This problem can be eliminated by the claimed correction. However, it can also be shown analytically that a scalar multiplication of the time series at least reduces the problem. Such an imperfect solution can also be regarded as a correction, even if not as complete, since this reduces the problem at least.

According to the simulation described above, the same effect is now measured with real sensors. In order to verify the amplitude correction, an object is photographed which changes its location relative to a camera. For this purpose, a camera was focused onto a test pattern by means of ocular and lens. The collimated light beam between the objective and the ocular is reflected by means of a so-called tip-tilt mirror. The mirror can carry out highly precise tilting and tipping movements. By means of these movements, the relative position between the object (test pattern) is translationally modulated, such that the method from the previously described simulation can be verified. For verification, a sinusoidal movement of the mirror on both axes was set. The amplitude of this movement is known and was measured in pixel coordinates on the camera. The frequency of the sinusoidal movement is also known. The image rate of the camera is set to a value, which lies just above twice the frequency of the mirrors motion. Several time series are then measured using this test. Each measured time series is based on a different duty cycle of the camera, wherein the different duty cycles are equally distributed in the interval between zero and one. It can be observed that the reconstructed amplitudes of the time series of the location of the object differ. The amplitude decreases as the duty cycle increases. Normalization to the maximum amplitude out of all time series of a coordinate shows that the amplitude underestimate runs in accordance with the curve of the filter. This test therefore confirms the theory, which is basis of the correction method, and in turn verifies the correction method. Inaccuracies from the test are based on inaccuracies of the relative measurement by means of correlation and do not impede the correction by a filter.

Previous verifications are limited to relative measurements of the location. In a further test, a correction of a time series of the intensity was verified. To verify this amplitude correction, a camera was illuminated homogeneously, whereby the illumination intensity was modulated by an LED controller. This illumination intensity is again modulated with a signal in sinusoidal form, so that the amplitude of the intensity fluctuations is always constant. In contrast, the frequency of the intensity fluctuations is variable. Frequency stimuli between values just above zero and just below half the frequency of the camera are modulated, which guarantees a nearly complete variation within the Nyquist scannable range. For each value of these variable frequencies, a time series is again measured, the duty cycle remains constant and known. The reconstructed amplitudes are then calculated for each time series. They are in turn normalized to the maximum measured amplitude. All normalized amplitudes are plotted against the underlying frequency of the intensity fluctuation. The technical problem of measuring intensity variations with cameras is illustrated. It can also be seen that the claimed method of correction shows effect.

DETAILED DESCRIPTION

Figure 1:
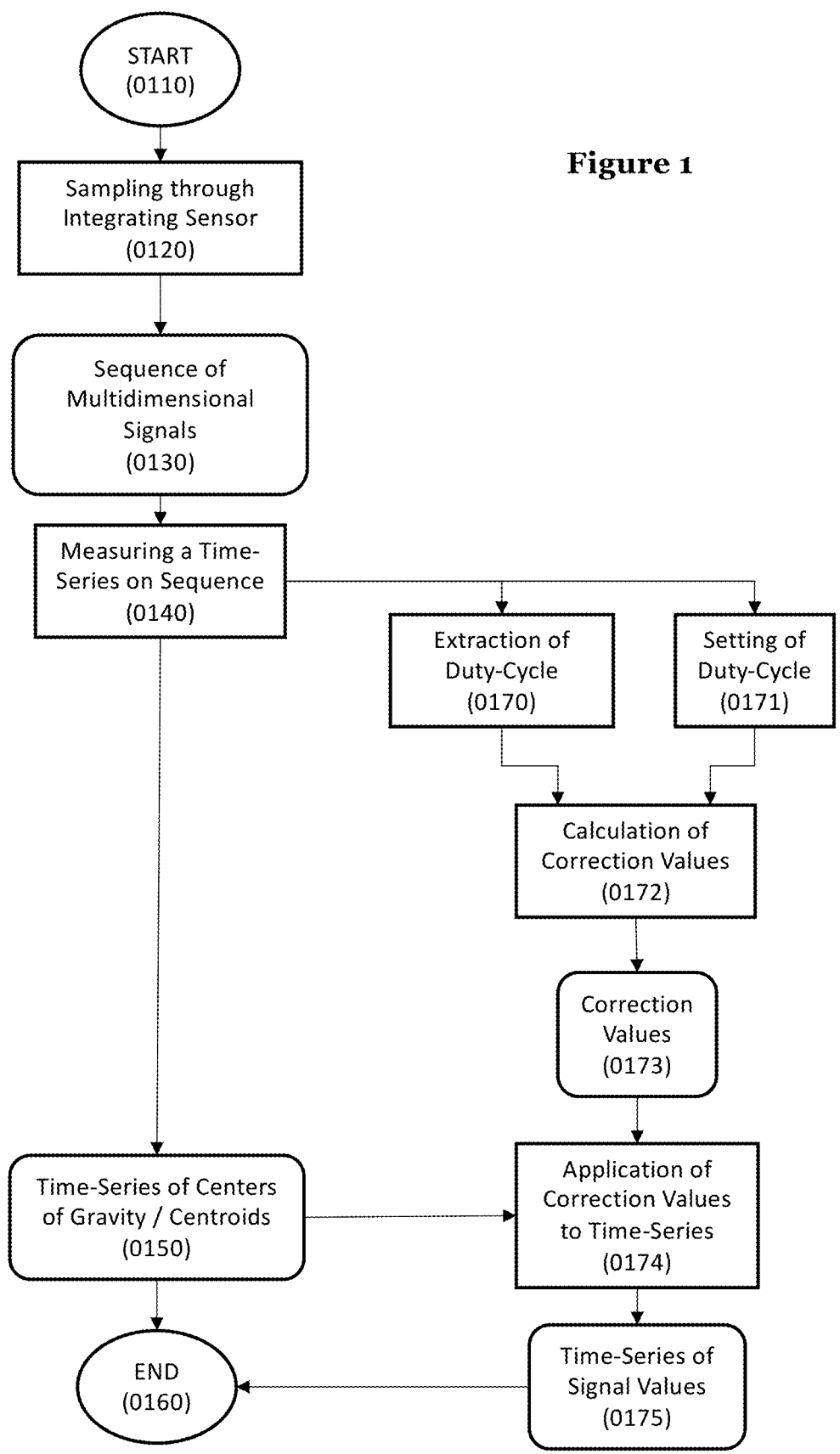
FIG. 1 shows a method for correcting errors in time series measured in an integrative manner according to the described embodiment.

FIG. 1 describes the correction method in comparison with the prior art by means of a flow diagram. Both the prior art and the expansion thereof by the described correction method are based on the sampling of a time series, which process can be described as integrative sampling 0120 in order to obtain samples. This integrative sampling is characterized by a sensor with an integration time, which can be described as a duty cycle. This sampling gives a sequence of multi-dimensional signals 0130 in order to obtain one or more measured values. On this sequence of multi-dimensional signals, a time series is measured 0140, it being assumed that the integration of the sensor leads to the time series being degraded by the formation of centroids. A plurality of time series can also be measured, even by means of direct or indirect or also relational measurement. Samples and measurements values do not have to be distinguished, for example in the reconstruction of intensity variations in images. The prior art (left branch) would not apply any correction methods to conclude from the centroid-degraded time series 0140 to the actual or true signal values 0174, but rather accept the centroid-degraded time series 0150 as a result (end 0160). Corrections with other objects are not taken into account in this diagram. On the other hand, the described correction method (right branch 017X) extracts the preset parameter of the duty cycle 0170 or a value, which can be regarded as equivalent, for example the integration time. Equivalently, the set duty cycle or an adjusted equivalent value can also be used 0171. It is characteristic of the present correction that correction values 0173 are calculated from a duty cycle obtained in this way, which correction values are applied to the time series, degraded by centroid formation 0150, calculating a time series 0175 corrected by the degradation.

Figure 2:
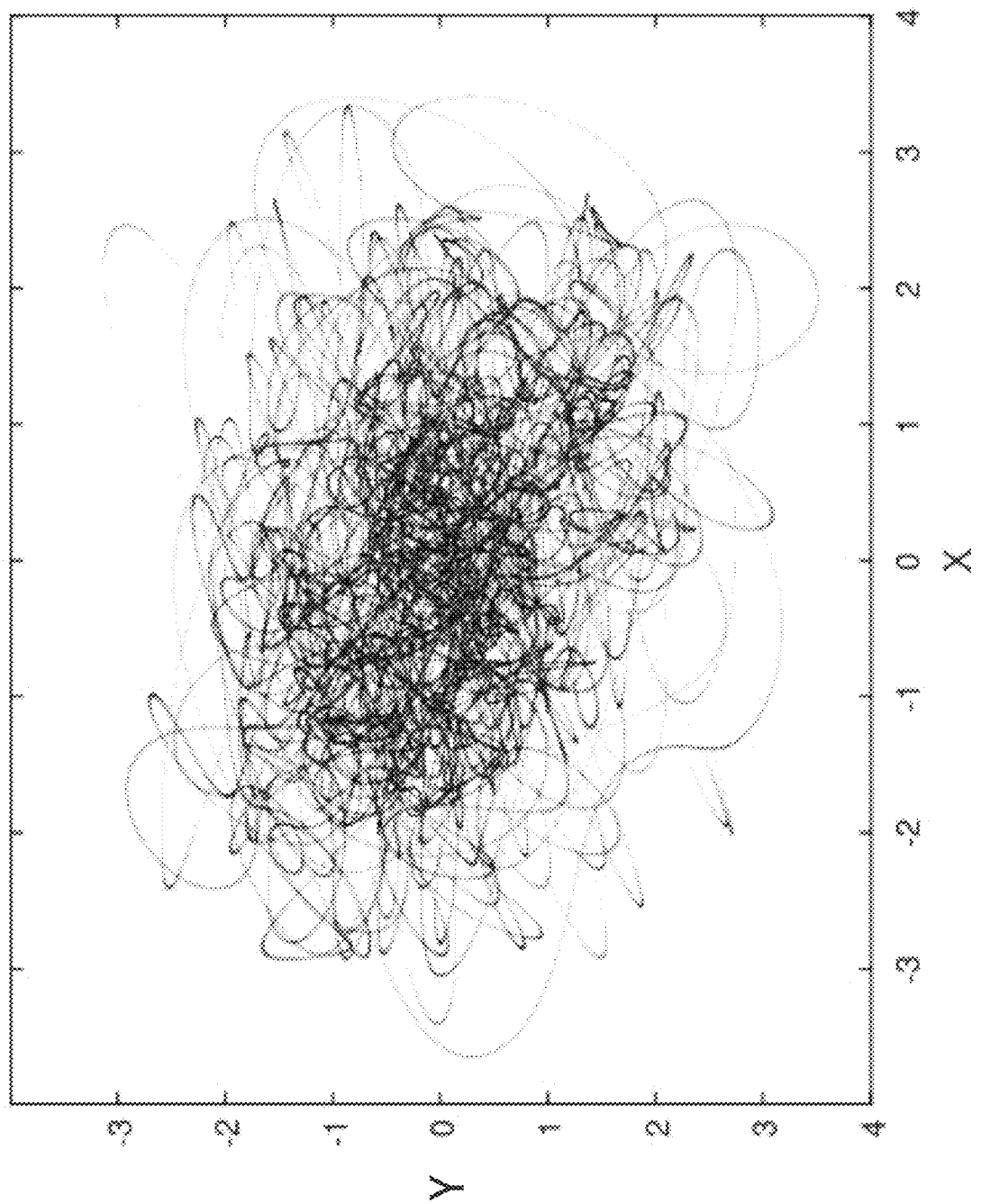
FIG. 2 shows an over-resolved blur kernel of a long-term exposed photograph that degrades the photograph based on simulated translational motions between the camera and the object.

FIG. 2 illustrates an over-resolved point spread function (motion blur PSF), which was simulated by relative, translationally motion between a camera and an object. The axes describe the pixel resolution of the simulated camera. The motion blur PSF is an interpolation of the two-dimensional trace between the camera and the object. It is to be clarified that motions continue to run continuously during the integration time, so that the degradation occurs as motion blur. Furthermore, it is to be shown that the degradation motion blur consists of two time series which describe the x and y coordinates of the camera as a variation of the time.

Figure 3:
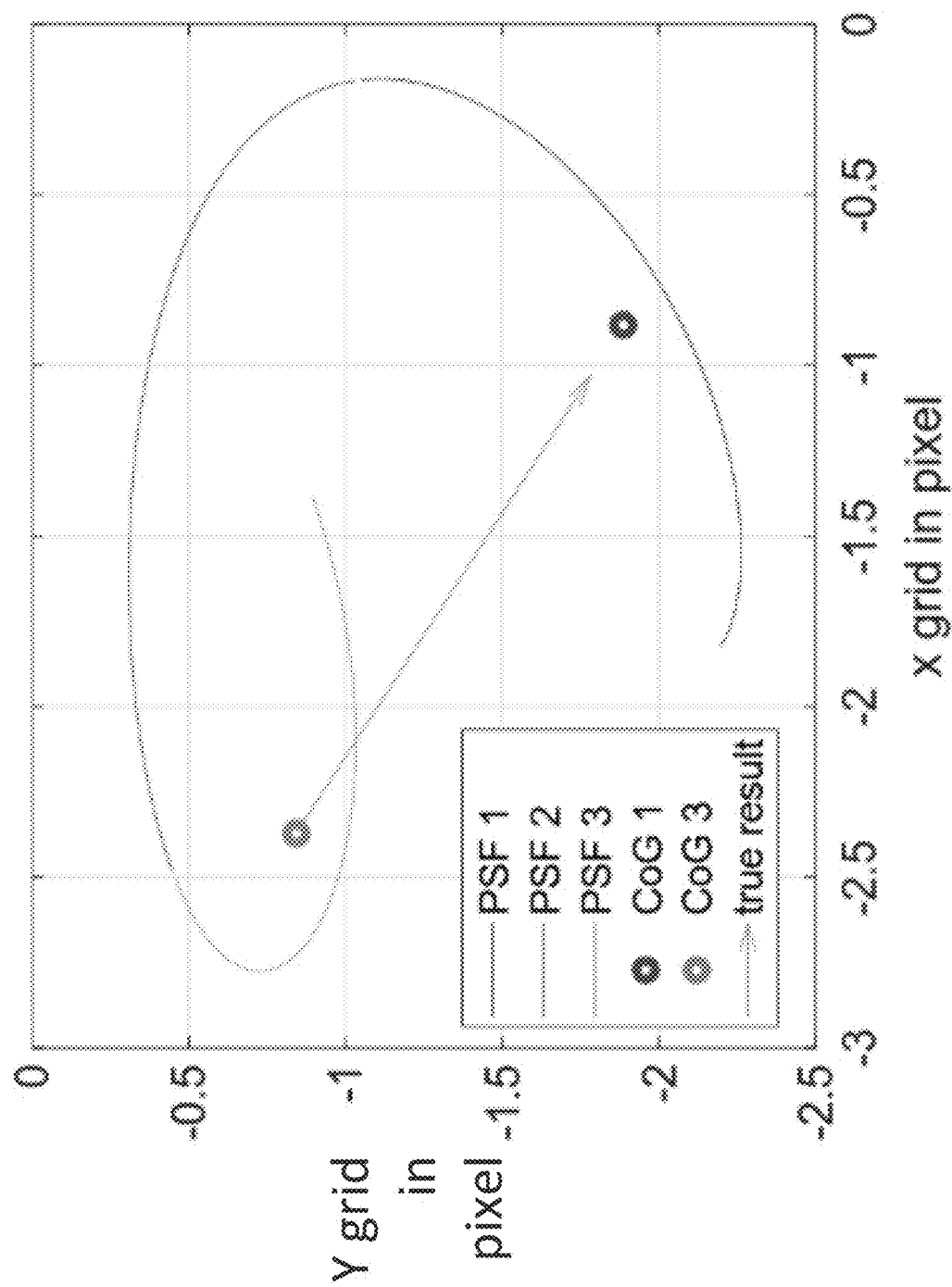
FIG. 3 illustrates the principle of image registration. The true result of a cross-correlation is the distance between the blur kernels of the correlated images (here PSF 1 and PSF 3).

FIG. 3 now shows the same principle as FIG. 2. However, the integration time is substantially shorter, so that the motion blur PSF of a photograph is also substantially shorter. The PSFs of three photographs are shown as PSF 1, PSF 2 and PSF 3. Associated centroids of PSF 1 and PSF 3 are drawn, named CoG 1 and CoG 3. FIG. 2 illustrates the principle of image registration of such images, which are degraded by motion blur. The illustrated case relates to a correlation of the photos with the PSF 1 and the PSF 3, both photographs photographing the same object but with different degradations. The true result of the inverse correlation is the vector of CoG 3 after CoG 1.

Figure 4:
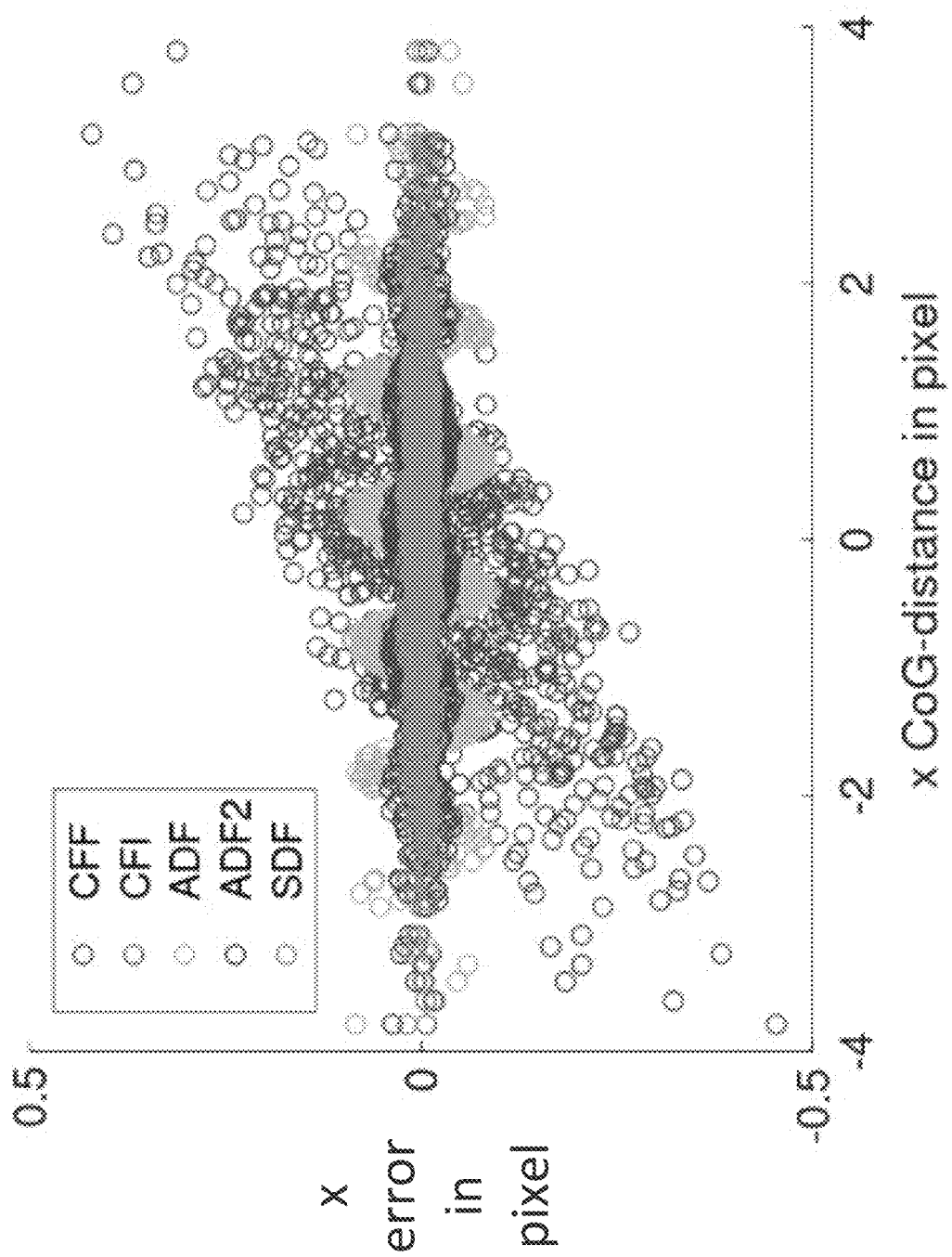
FIG. 4 shows the accuracies of the tested image correlations. The reference value of the measured errors is plotted.

FIG. 4 shows the accuracies of the tested algorithms for the correlation of two motion blur degraded images on one axis, that is to say the accuracy of the reconstruction of a centroid-based time series. The error of the registration in pixel lengths is specified, against the true result of the correlation as previously defined. The algorithms investigated originate from (Lofdahl, M G, "Evaluation of image-shift measurement algorithms for solar shack-Hartmann wavefront sensors, U Astronomy and Astrophysics 524 (2010).), and are named according to the nomenclature there. It can be concluded that all algorithms calculate the true value of the registration as defined, since the average error is always equal to zero.

Figure 5:
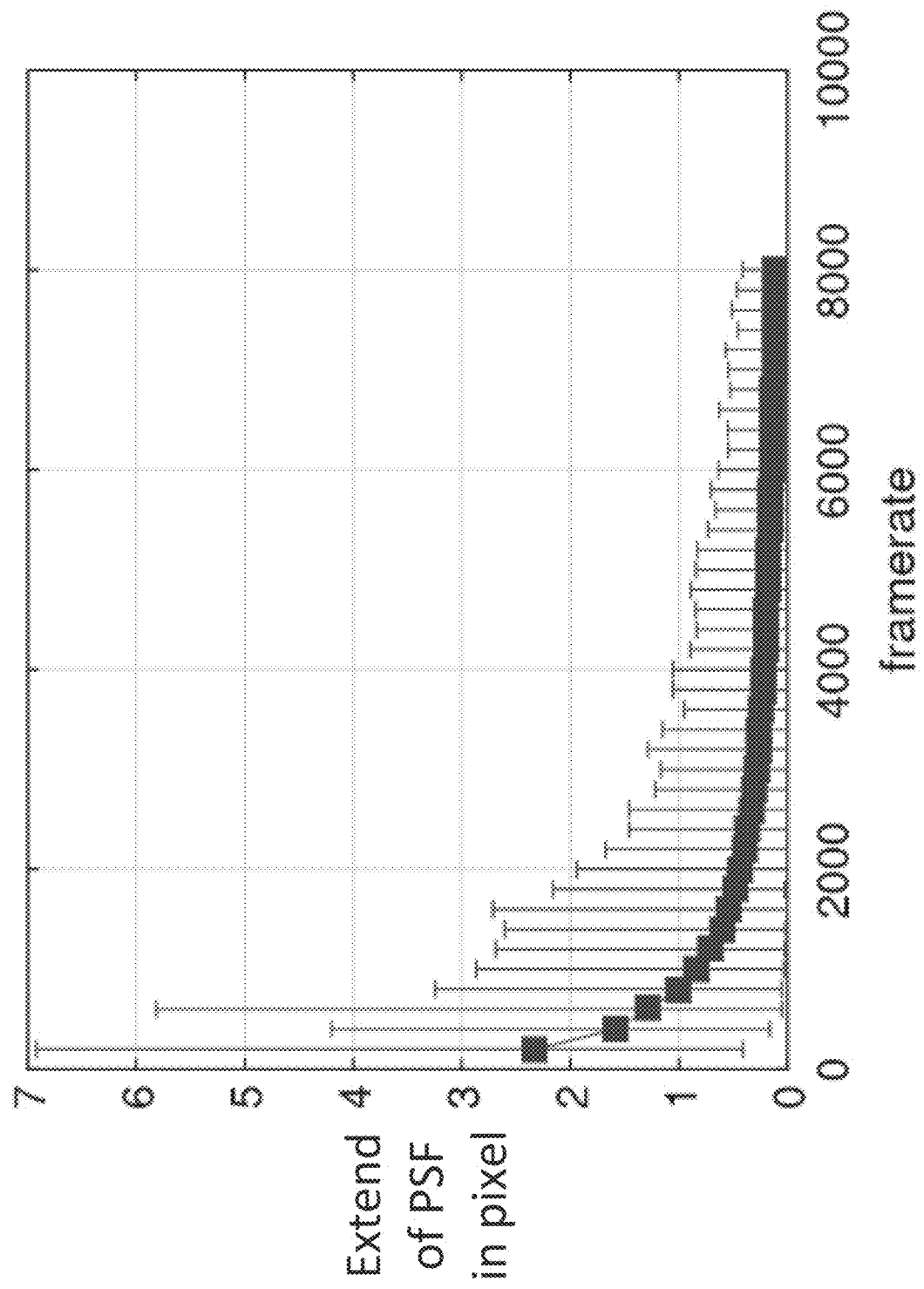
FIG. 5 shows the expansion of the blur kernel along an axis, varying with the frame rate of the camera.

FIG. 5 now shows the dependence of the corrected error (motion blur extension along one axis) on the frame rate, under the condition that all other factors are constant. This representation is interesting in the context of the prior art. At high frame rate, the error is very low, so that its correction can be neglected. However, the state of the art is not able to deal with high extensions of the motion blur at low image rates.

Figure 6:
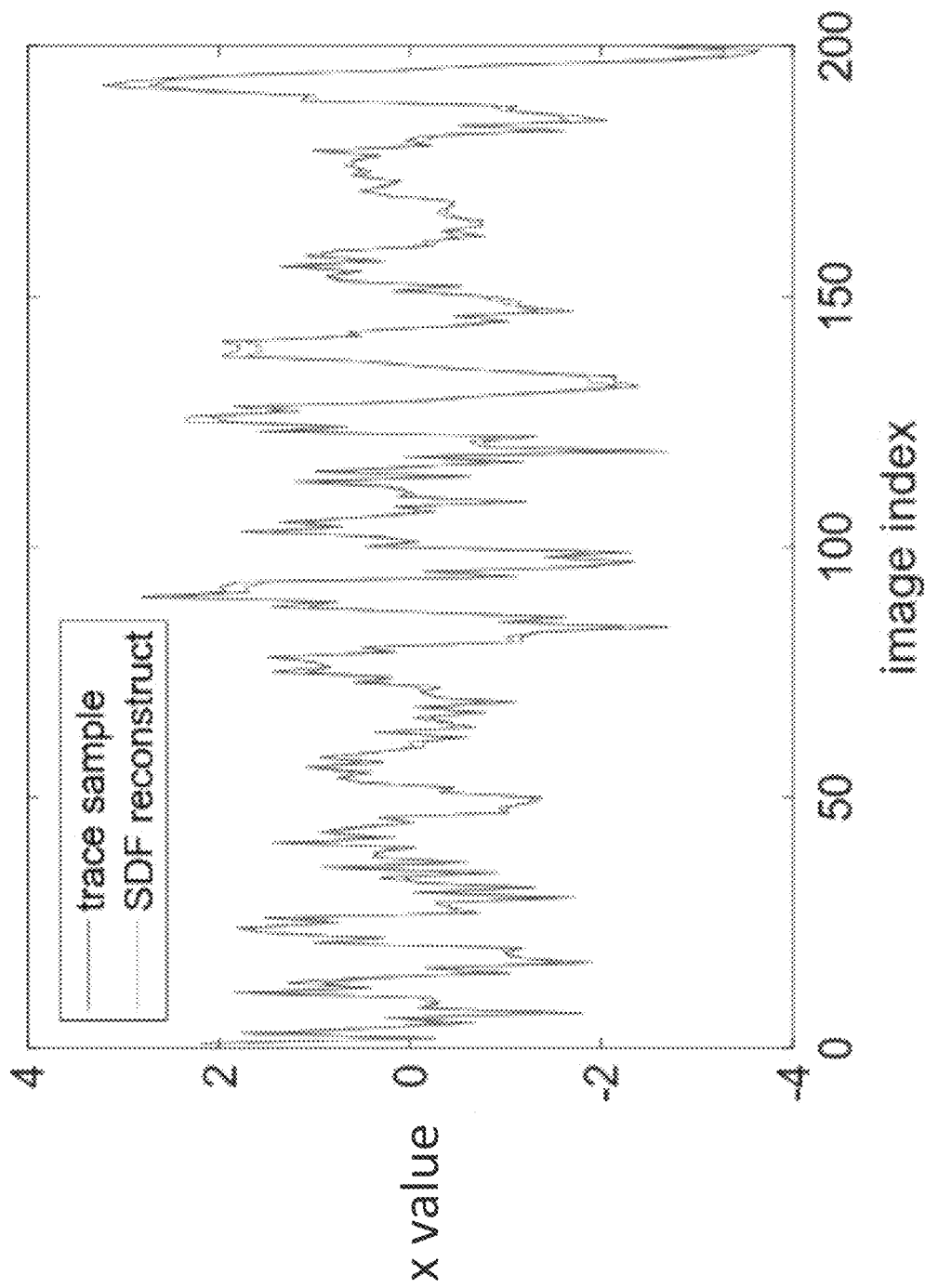
FIG. 6 shows the true time series of the relative position of the object and the camera on an axis, and its reconstruction based on a correlation.

FIG. 6 shows the time series of the relative position between the camera and the object on the x-axis in pixel coordinates (blue), and a reconstruction by means of correlation without claimed filter correction (orange). The representation is based on the same input values as in the simulation from in FIGS. 3 and 4. It is shown that the underestimation of the sought signal by integrative measurement is not irrelevant.

Figure 7:
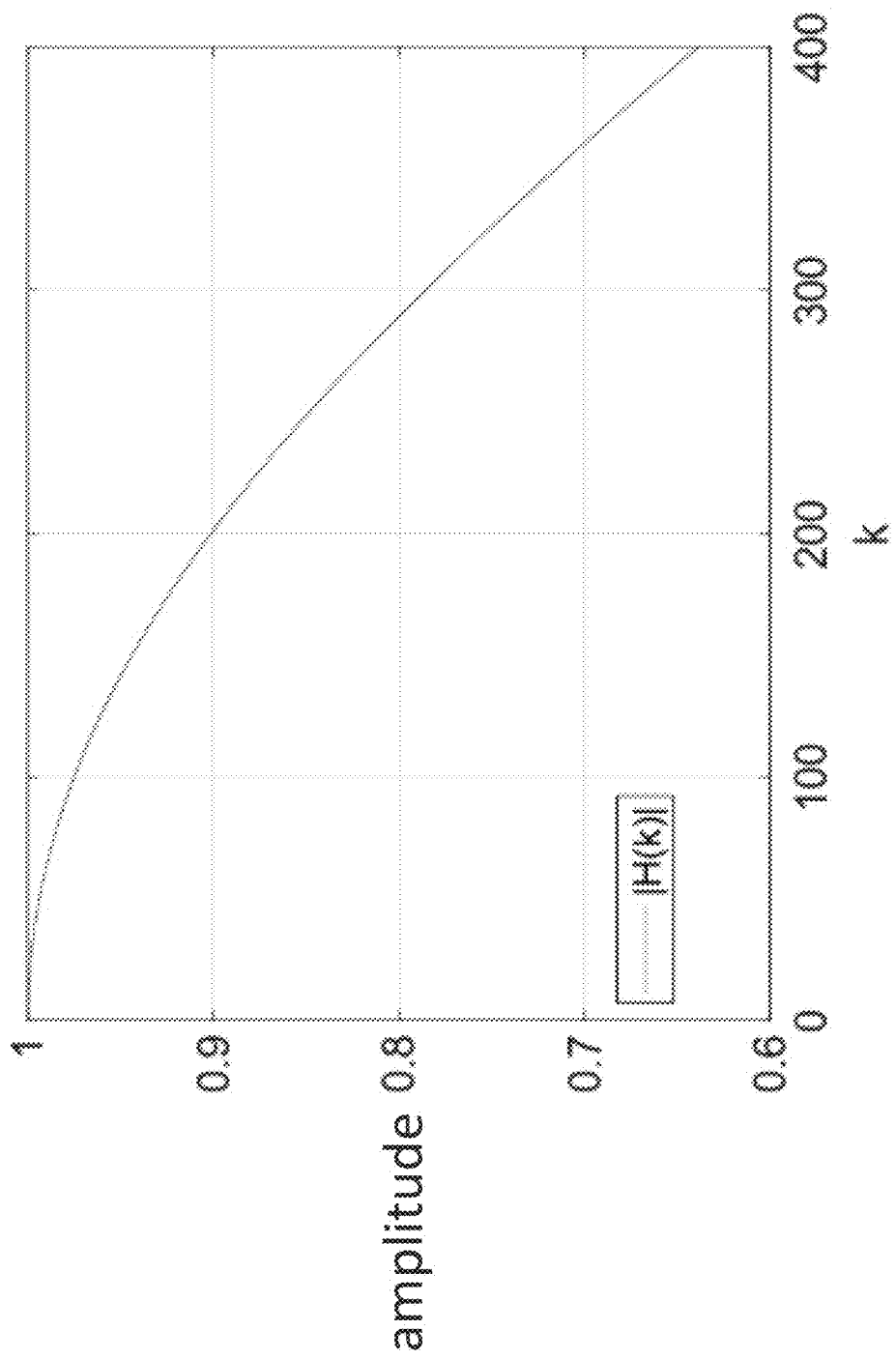
FIG. 7 shows the filter in its forward form for a duty cycle of 1 at a frame rate of 800 Hertz.

FIG. 7 now shows the corresponding filter in the Fourier domain in its forward form. The frame rate is 800 Hertz according to the illustration. Only positive frequencies are drawn, negative ones are symmetrical to the y-axis. The phase of the filter is always equal to zero, therefore only the absolute value is shown. The DC-component has been continued continuously with one.

Figure 8:
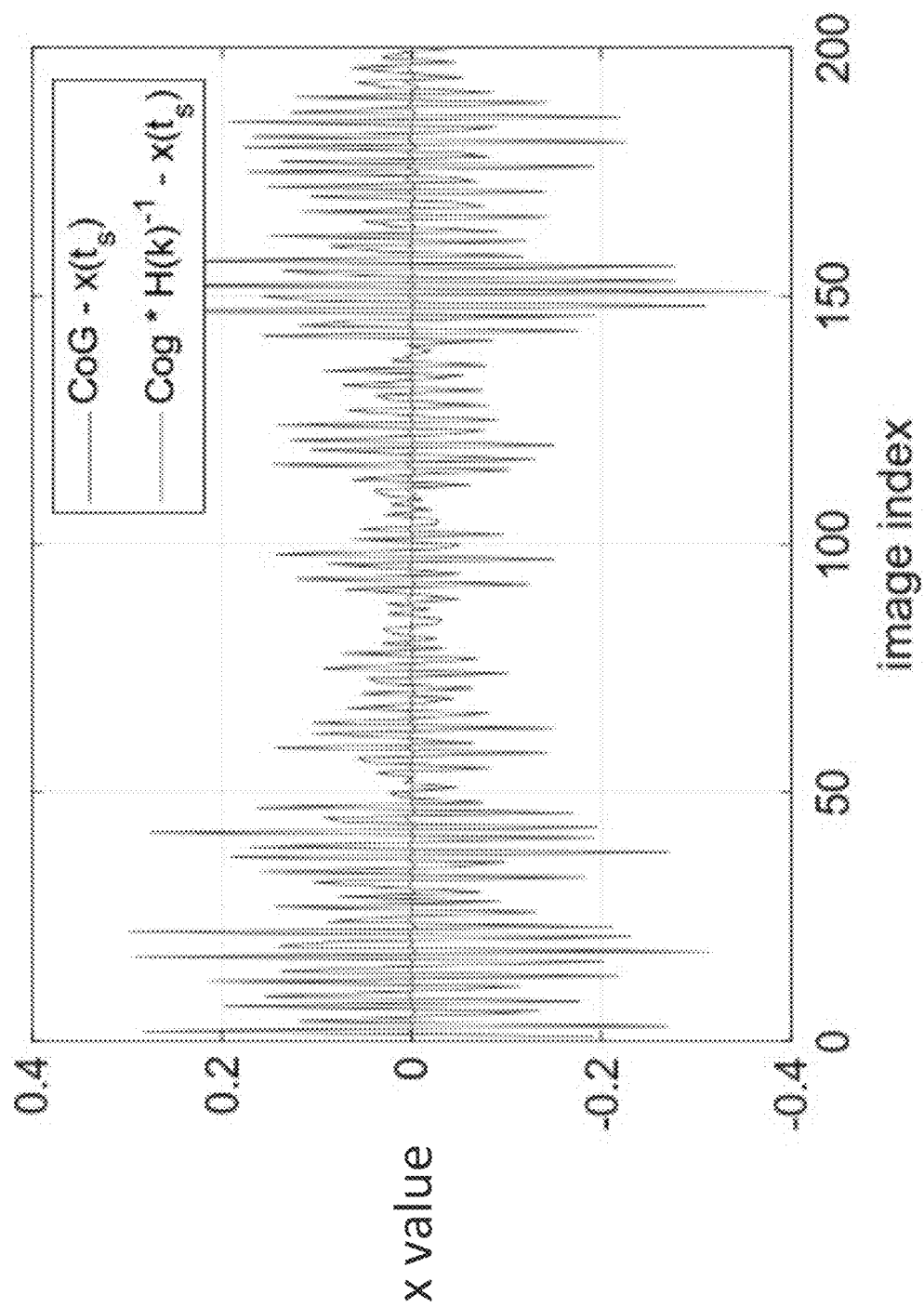
FIG. 8 shows the time series of the error of the location on an axis against the image index, wherein the error is either the distance between the local center of gravity of the location signal on an axis and the true location signal (blue), or the same error after the application of the correction (orange).

FIG. 8 shows the application of the correction to the time series of the continuous centroid values of the signal. The distance on the x-axis in pixels, between the true signal value (x(t)) and its symmetrical center of gravity (CoG), is represented once in blue. This value corresponds to the error which would arise in the application of the prior art. This error is corrected to zero if the claimed reconstruction method is used.

Figure 9:
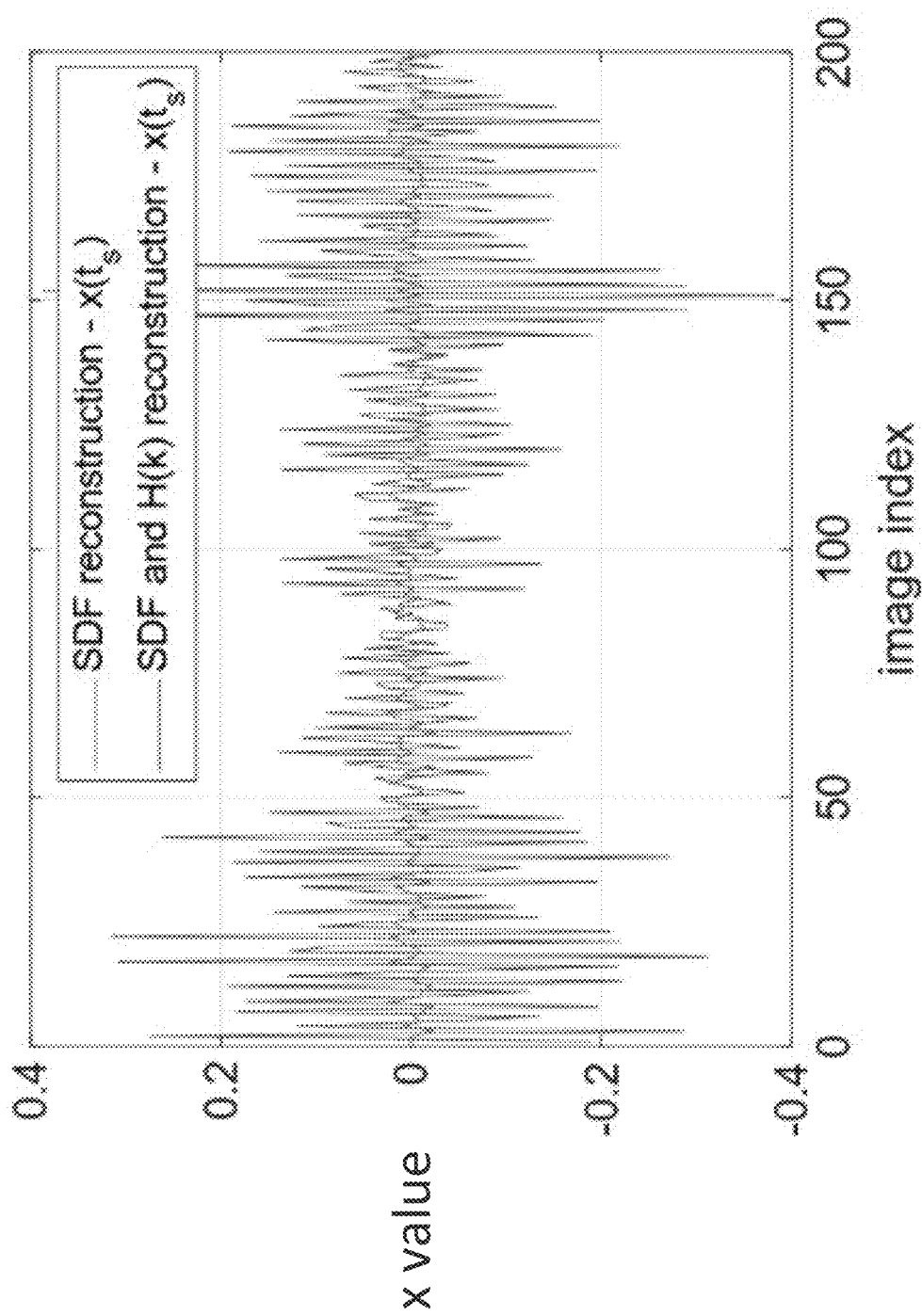
FIG. 9 shows the time series, measured by correlation, of the error of the location on an axis against the image index, wherein the error is either the distance between the center of gravity of the location signal calculated by correlation on an axis and the true location signal (blue), or the same error after the application of the correction (orange).

FIG. 9 shows the same principle as FIG. 8, but the input values are different. Instead of the true signal x(t), its discrete reconstructions are now based on correlation results. It becomes clear that the correlation has a slight inaccuracy and that the reconstruction of this inaccurate, centroid-based signal with the claimed method is still possible. The error is significantly reduced overall, but a minor residual error remains.

Figure 10:
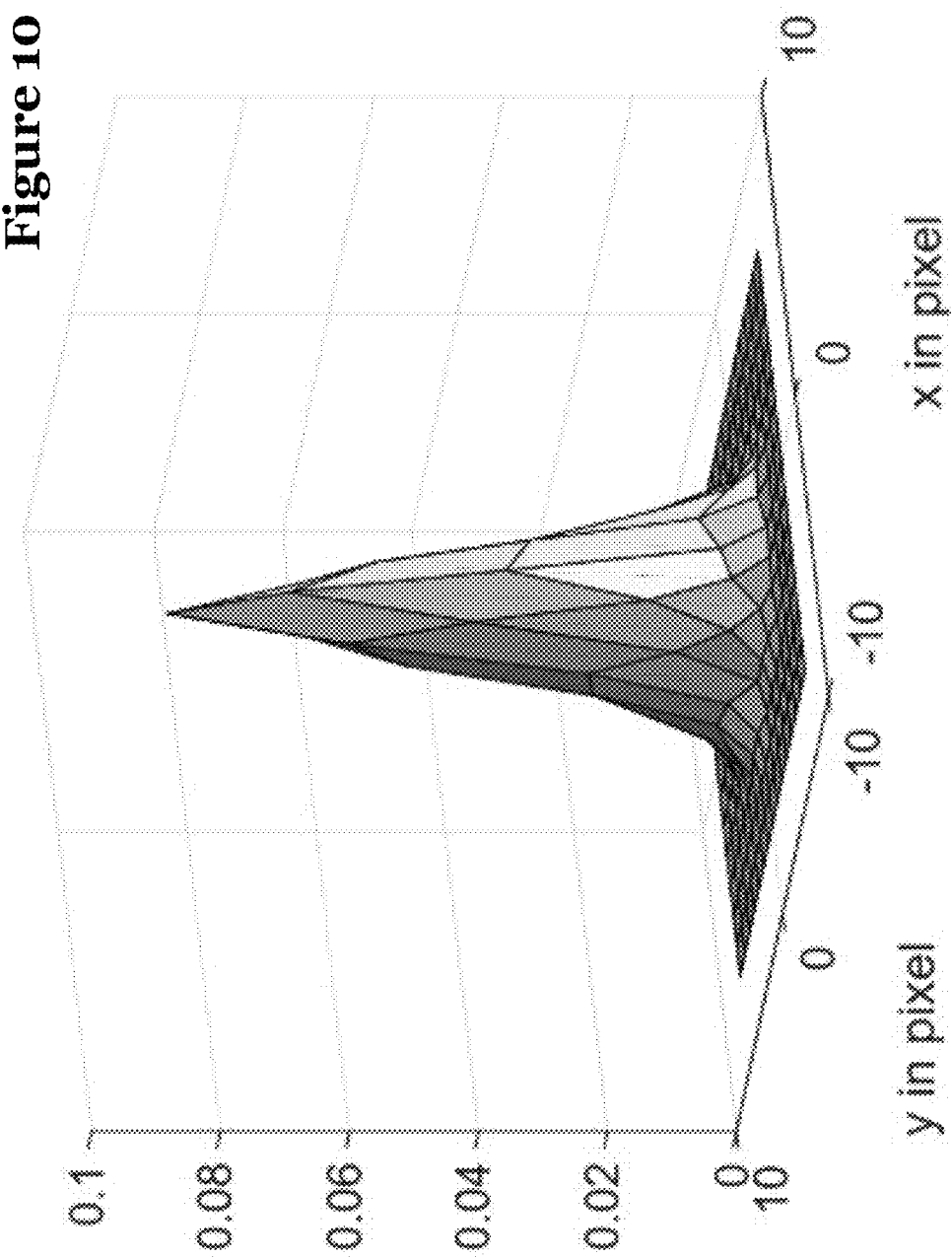
FIG. 10 shows a PSF which has been interpolated based on true time series of the location.

FIG. 10 shows a PSF as it was interpolated from the time series of the x and y positions between the camera and the object. The basis of this is a long-term exposed photograph. In the following, the maximum height of the PSF and the maximum extension are relevant.

Figure 11:
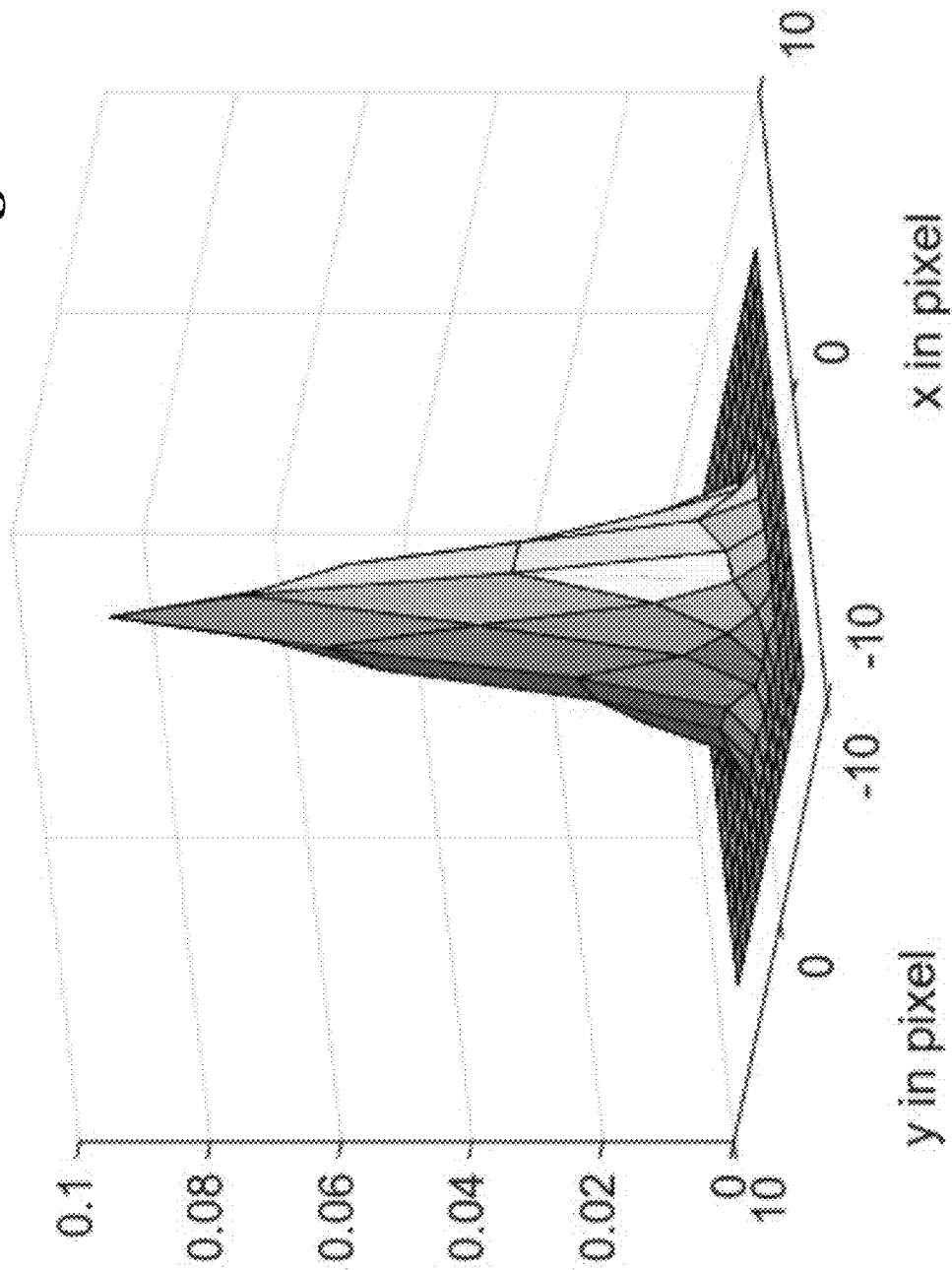
FIG. 11 shows a PSF which has been interpolated on the basis of time series of the location measured by correlation.

FIG. 11 shows a PSF like in FIG. 11, but this was generated based on correlations results. This PSF has a higher maximum value and slightly less maximum extension into the widths.

Figure 12:
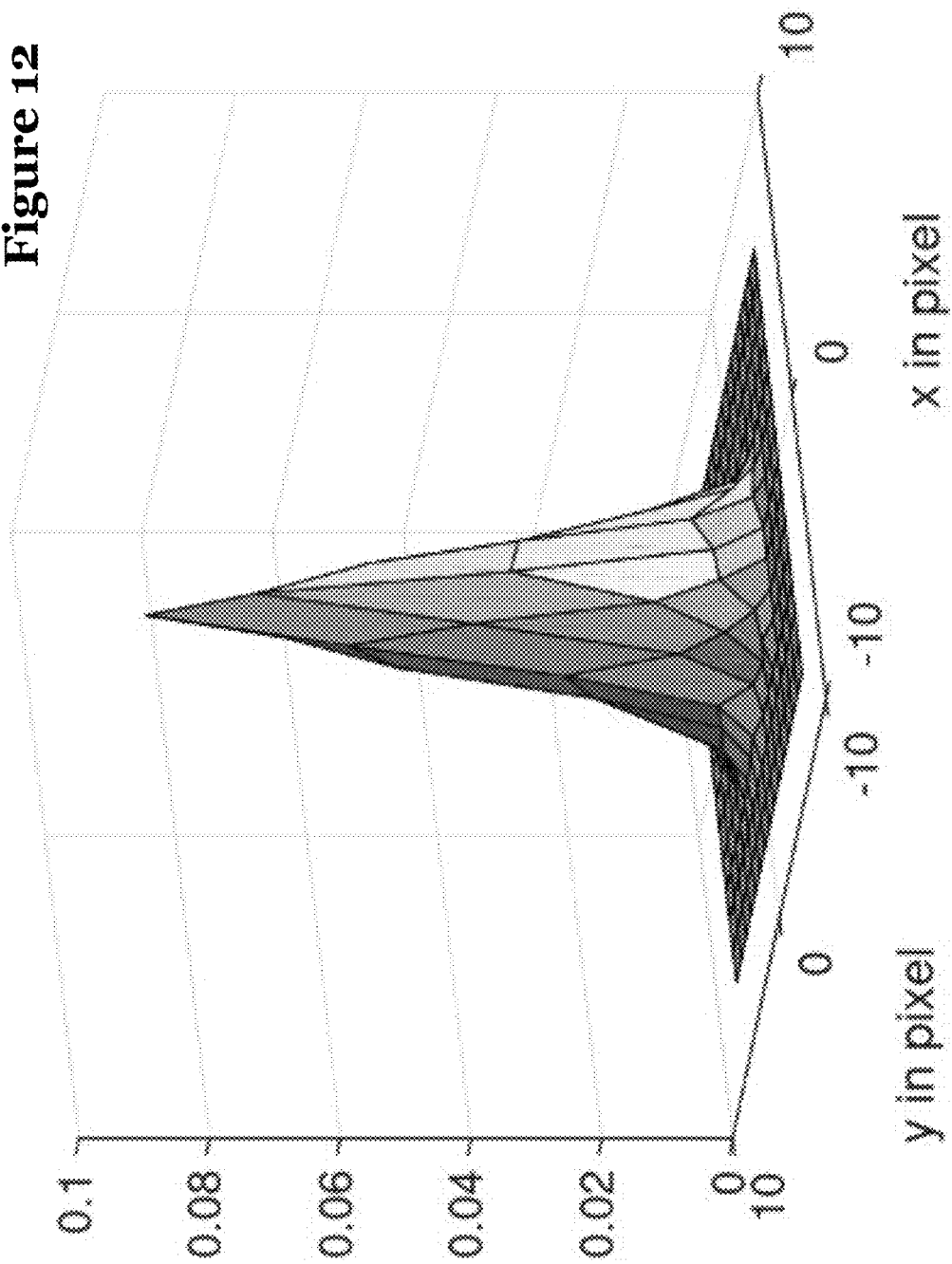
FIG. 12 shows a PSF which has been interpolated on the basis of time series of the location measured by correlation, the time series being reconstructed by the Fil ter.

FIG. 12 shows the PSF of FIG. 11, where the time series of the relative position between the camera and the object was previously corrected with the claimed method. It can be seen that the aforementioned maximum values are reconstructed better than without a claimed correction method.

Figure 13:
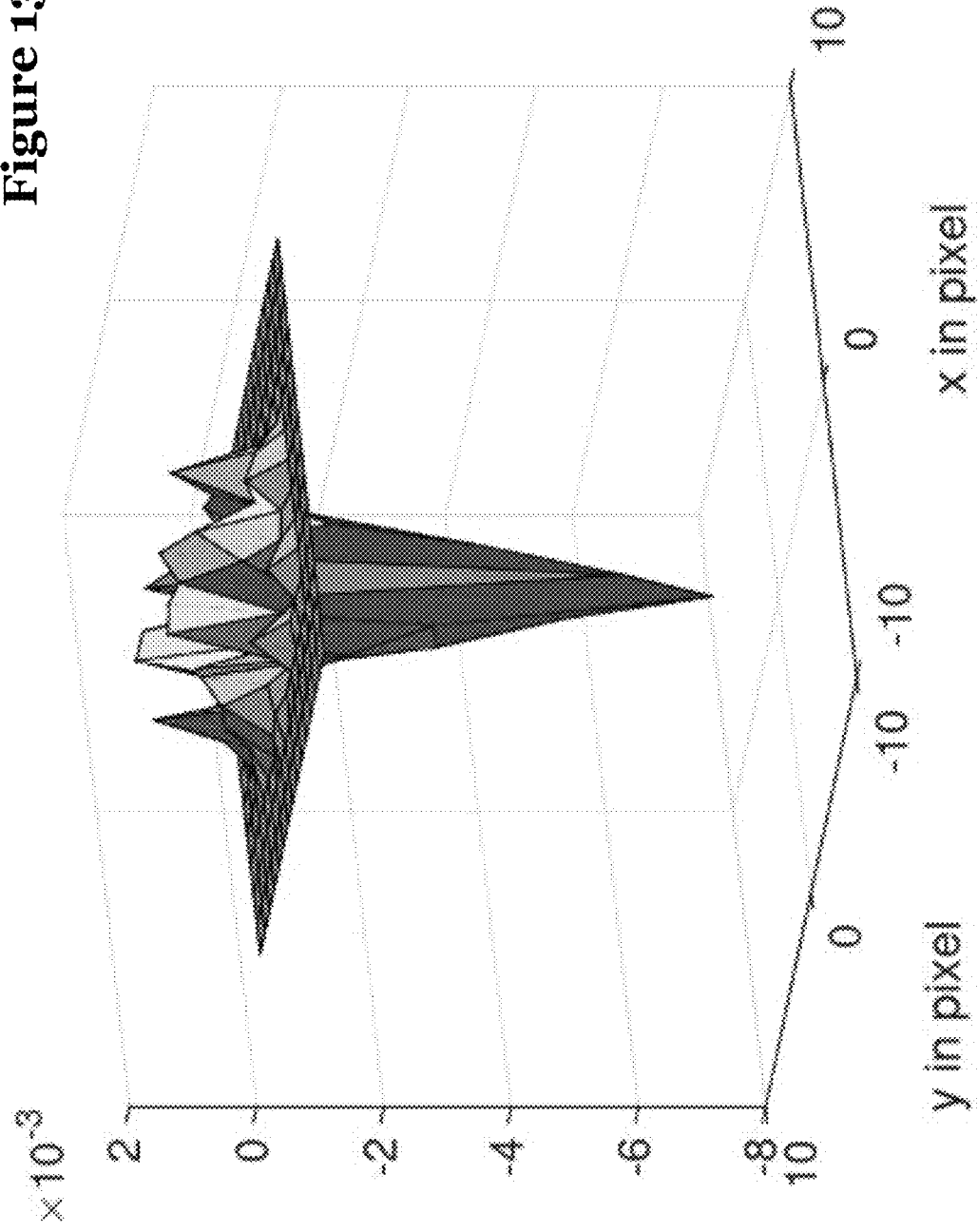
FIG. 13 shows a PSF which is the difference between the PSF in FIG. 10 and the PSF of FIG. 11.

FIG. 13 shows the difference from the PSFs of FIG. 10 minus the PSF of FIG. 11. Said properties of both PSF lead to the fact, that this difference is negative around the origin, and positive towards the border. Furthermore, it can be seen that the integral over the absolute value of the difference PSF is relatively large.

Figure 14:
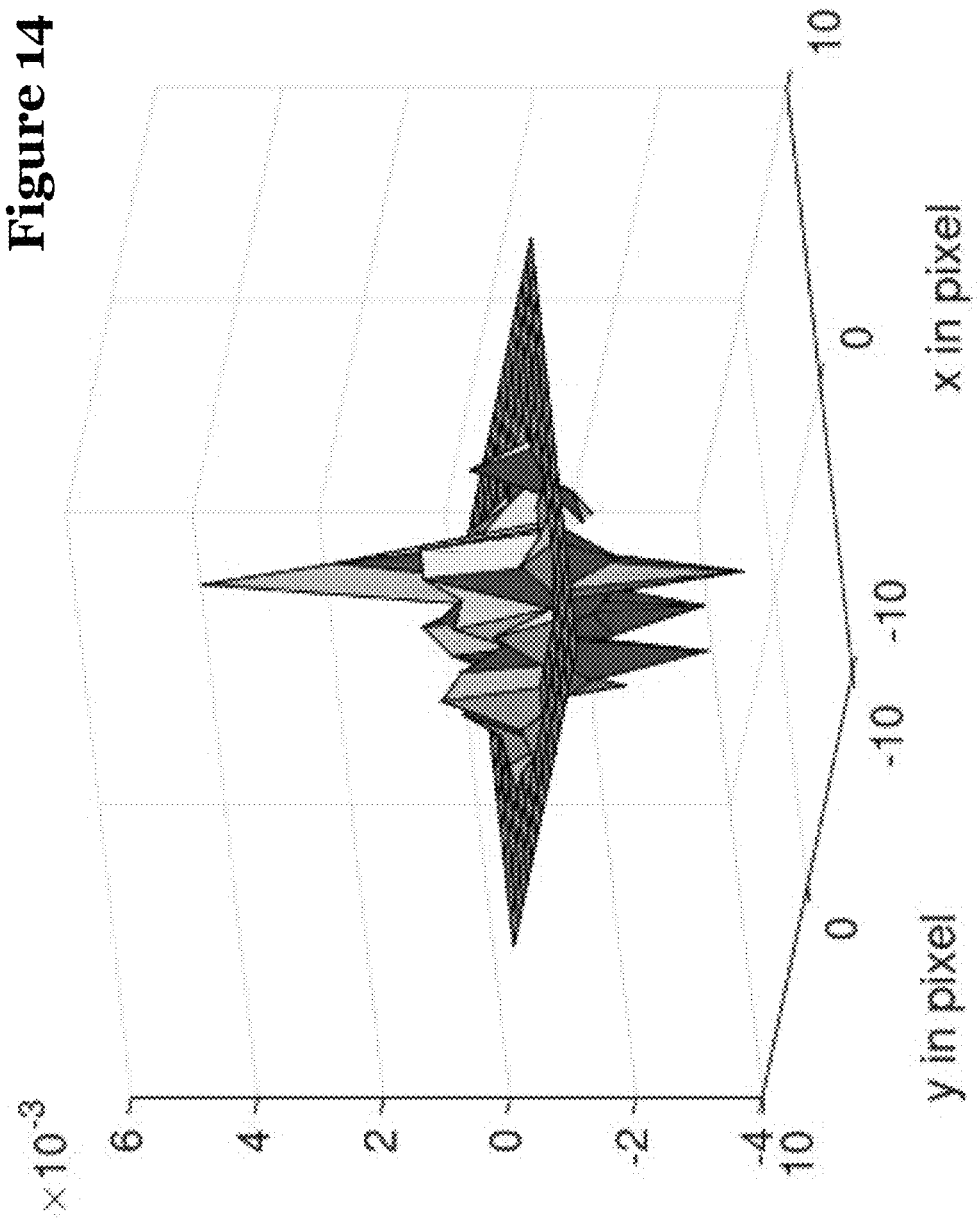
FIG. 14 shows a PSF which is the difference between the PSF in FIG. 10 and the PSF of FIG. 12.

FIG. 14 now shows the difference from the PSF of FIG. 10 minus the PSF of FIG. 12. It can be seen that the integral over the absolute value of the difference PSF is relatively low, above all compared to FIG. 13, thus again illustrating an optimization by error minimization.

Figure 15:
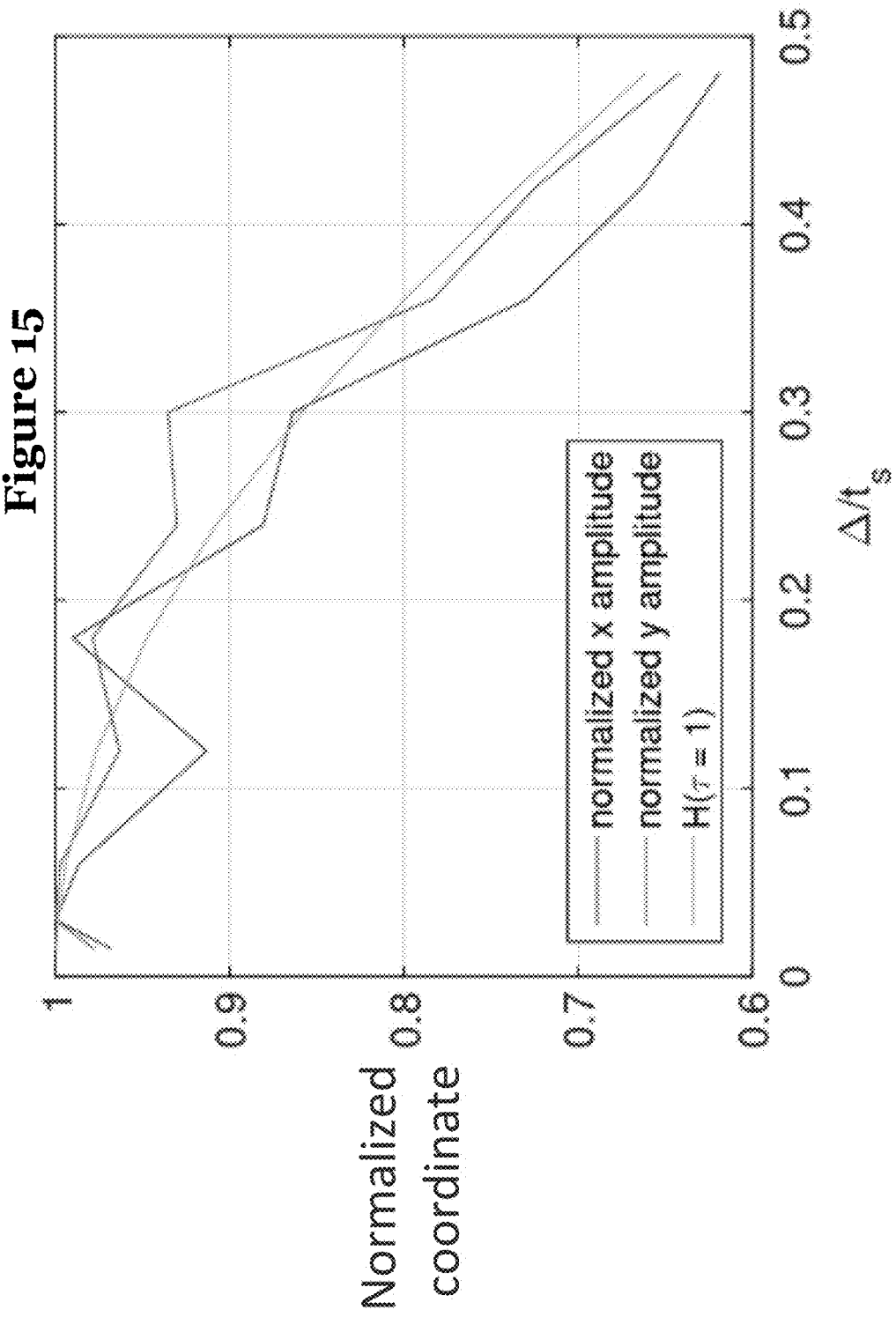
FIG. 15 shows the measurement results for verifying the reconstruction of time series of the relative location with cameras.

FIG. 15 shows the results of the verification of the amplitude correction during the measurement of time series of the relative location. The horizontal axis shows half the set duty cycle, given as a symmetrical integration interval, normalized to the sampling time, the vertical shows the measured amplitude, normalized to the maximum measured amplitude. This representation was selected since it enables the amplitudes of the filter to be recorded, which is also shown (H). The drawing of the filter by means of the measurement results verifies the claimed correction. Inaccuracies can be explained by residual errors of the correlations.

Figure 16:
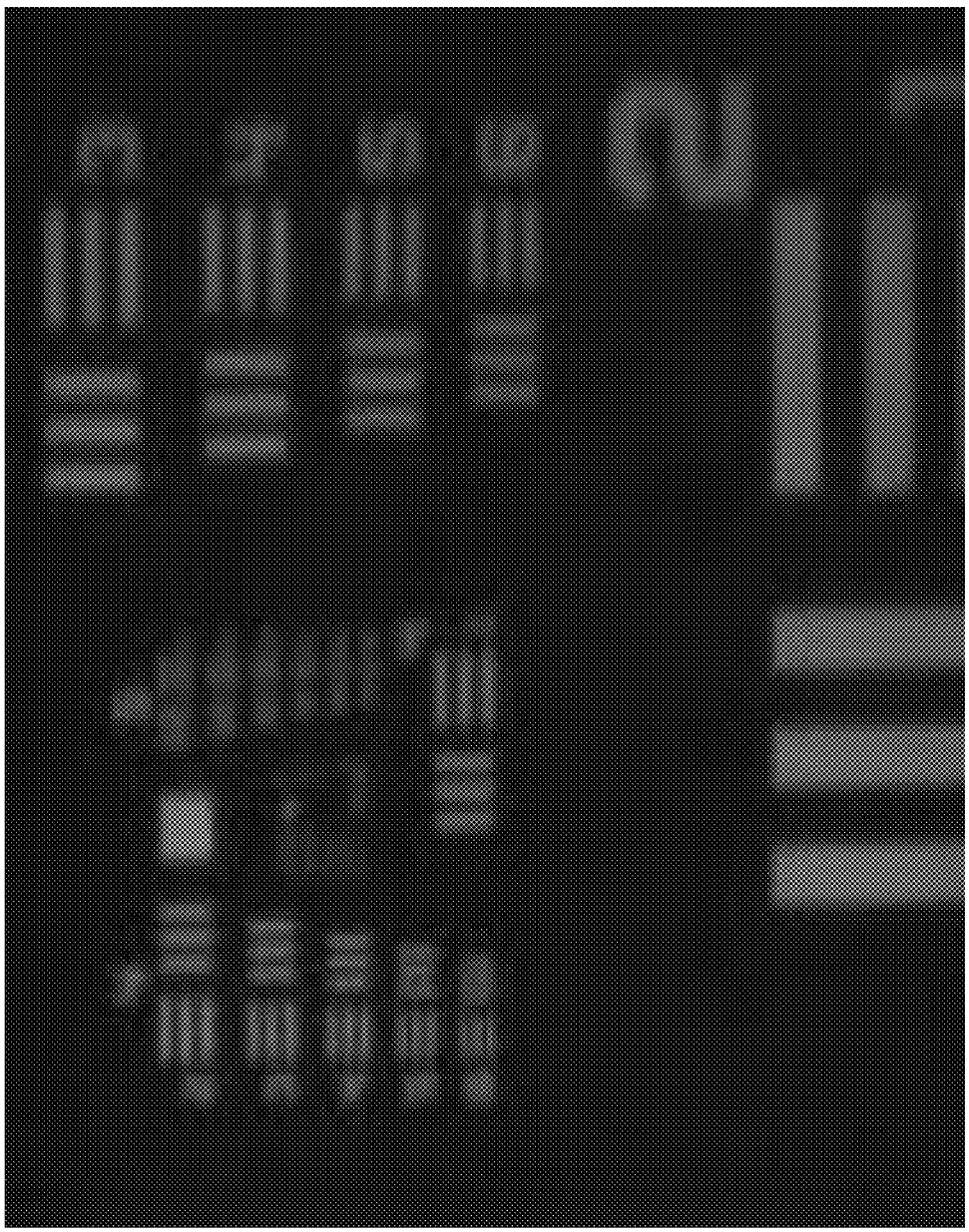
FIG. 16 shows the reference image from the measurement for verifying the reconstruction of time series of the relative location with cameras at minimum exposure time.

FIG. 16 shows the blur of the reference image from the experiment of FIG. 15, with the smallest possible duty cycle configured in this measurement. It is to be understood that the latter is relatively moderate. The sense of the image is shown in comparison with FIG. 17.

Figure 17:
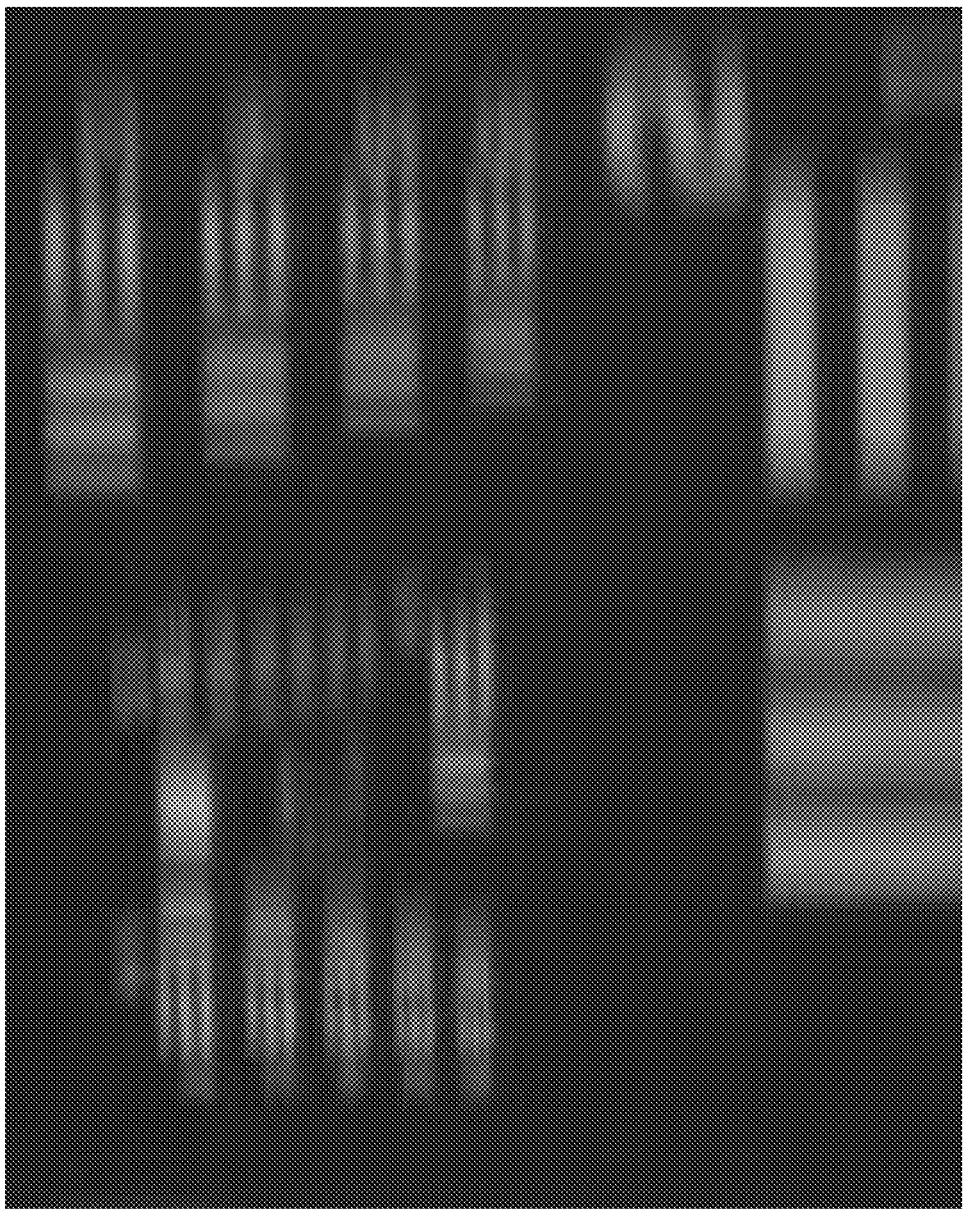
FIG. 17 shows the reference image from the measurement for verifying the reconstruction of time series of the relative location with cameras at a maximum exposure time.

FIG. 17 shows the blur of the reference image from the experiment of FIG. 15, with the largest possible duty cycle configured in this measurement. The blur now has considerable dimensions. This represents the correctness of the assertion that there is a continuous change in the relative position between the camera and the object during the integration time, which depends on the duty cycle.

Figure 18:
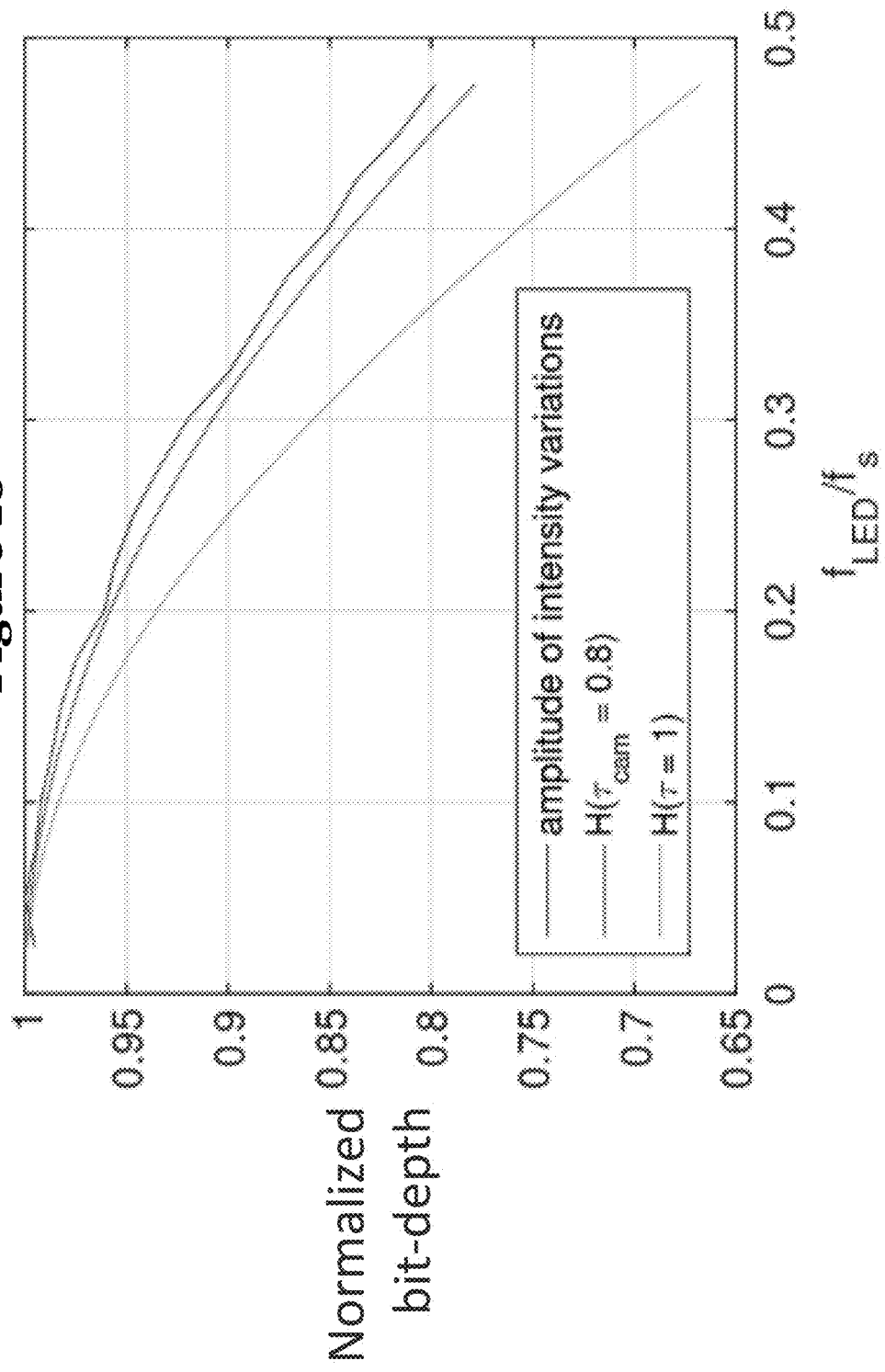
FIG. 18 shows the measurements for verifying the reconstruction of time series of intensity using cameras.

FIG. 18 shows the measurement results from the experiment for verifying the amplitude correction in the measurement of time series of the intensity. The horizontal shows the frequency at which the amplitude of the intensity of the LED is modulated, normalized to the 800 Hertz frame rate of the camera. The vertical shows the amplitude, which can be measured as a function of time, normalized to the maximum measurable amplitude from all measurements. This form of representation was again selected because it makes it possible to draw the filter. The filter in forward form is shown for duty cycle equal to one and equal to 0.8. It can be taken from the results that the measurement curve approximates the curve of the filter for 0.8. This in turn verifies the claimed correction, since the duty cycle of the camera in the experiment was equal to 0.8. The slight inaccuracy in the measurement can be explained in that adjustment of the frequency of the LED controller to near-zero values was not possible. The measured amplitudes were thus not normalized to the theoretically achievable maximum amplitude, as a result of which the measurement results were slightly higher than would be expected.

The method according to the invention has been developed in connection with the correction of residual tip-tilt errors due to micro-vibrations of the sunrise observatory, which has been transported in the gondola of a stratosphere balloon (Barthol, P et al, "The Sunrise Mission," Sol. Phys 268, 1 (34 (January 2011); Solanki, S K et al. SUNRISE: Instrument, Mission, Data, and First Results," ApJ 723, Li27 (Li33 (November 2010)). However, the same approach can also be used to improve the method of Ben-Ezra cited at the outset. However, it has many other fields of application over these specific applications and over the important range of imaging, in particular also of medical imaging, namely for each type of time series which are degraded by utilization levels of the specific sensor used.

The invention claimed is:

1. A method for correcting a time series of a plurality of measured values, the method comprising:
   obtaining the plurality of measured values, wherein each measured value is obtained respectively based on a multi-dimensional sample of an integrating sensor integrating an input signal over a time interval to obtain said sample, wherein
   correcting of the time series corresponds to a filtering of the time series in a frequency domain with an inverse sinc filter specified as a function of an integration time of the sensor, in order to correct a centroid formation caused by an integration of the integrating sensor.

2. The method of claim 1, wherein the measured values correspond to a location of an object.

3. The method of claim 1, wherein the integrating sensor senses sound waves and/or magnetism and/or particle flows, in particular photon flows.

4. The method of claim 3, wherein the integrating sensor is a CCD sensor, a CMOS sensor, a DEPFET sensor, or a time-delay integration sensor.

5. The method of claim 3, wherein the measured values correspond to a signal intensity.

6. The method of claim 1, wherein the measured values describe properties of a blur kernel, in particular, a wave-front degradation of light between an object and a camera.

7. The method of claim 1, wherein the measured values were obtained as relative measured values.

8. The method of claim 1, wherein the measured values describe properties of a noise.

9. The method of claim 1, wherein the correction is made in real-time in a data stream.

10. The method of claim 9, wherein one or more actuators are controlled with a corrected signal produced by correcting of the time series.

11. The method of claim 10, wherein an actuator is an element of an adaptive optical system or an active optical system.

12. The method of claim 1, implemented on a computer.

13. The method of claim 1, which performs the correction using transformation.

14. The method of claim 1, wherein the multi-dimensional samples are pre-processed to obtain derived time series.

15. The method of claim 14,
wherein the derived time series comprises one or more of gradients, velocities, areas, volumes, and/or flows, and
wherein the correction is applied to the derived time series.

16. The method of claim 9, wherein the correction is made in real-time in a data stream using analog or digital filter elements.

17. The method of claim 11, wherein the actuator comprises a deformable mirror.

* * * * *